US006556901B2

(12) United States Patent
Sugimura et al.

(10) Patent No.: US 6,556,901 B2
(45) Date of Patent: Apr. 29, 2003

(54) ELECTRONIC CONTROL UNIT AND METHOD MEASURING AND USING ELECTRIC POWER-OFF PERIOD

(75) Inventors: Atsushi Sugimura, Kariya (JP); Isao Amano, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/874,210

(22) Filed: Jun. 6, 2001

(65) Prior Publication Data

US 2002/0002429 A1 Jan. 3, 2002

(30) Foreign Application Priority Data

Jun. 29, 2000 (JP) ....................................... 2000-195868
Jun. 29, 2000 (JP) ....................................... 2000-195872

(51) Int. Cl.$^{7}$ ................................................. G06F 7/00

(52) U.S. Cl. ............................ 701/29; 701/33; 714/23; 714/25; 714/51; 714/55; 713/322; 713/340

(58) Field of Search ............................ 701/29, 31, 33; 307/10.1, 121, 130; 361/31, 86, 88; 714/25, 23, 51, 55, 814, 1, 2; 368/66; 700/2, 79, 298; 713/322, 340, 321; 322/25, 27, 28

(56) References Cited

U.S. PATENT DOCUMENTS

| | | | | | |
|---|---|---|---|---|---|
| 5,553,236 | A | * | 9/1996 | Revilla et al. | 713/322 |
| 5,850,514 | A | * | 12/1998 | Gonda et al. | 714/51 |
| 6,107,933 | A | | 8/2000 | Endo | 340/825.31 |
| 6,169,942 | B1 | | 1/2001 | Miller et al. | 701/29 |
| 6,320,275 | B1 | * | 11/2001 | Okamoto et al. | 307/10.1 |

FOREIGN PATENT DOCUMENTS

| | | | | |
|---|---|---|---|---|
| JP | 03126118 A | * | 5/1991 | G06F/1/24 |
| JP | 4-292545 | | 10/1992 | |
| JP | 10-160642 | | 6/1998 | |

* cited by examiner

*Primary Examiner*—Jacques H. Louis-Jacques
(74) *Attorney, Agent, or Firm*—Nixon & Vanderhye P.C.

(57) ABSTRACT

In an ECU for vehicles, a clock IC operates with sub power and measures time continuously irrespective of whether a microcomputer is operating. The microcomputer determines whether the clock IC has been reset on the basis of a history indicating that the sub power has fallen below a data holding voltage of an SRAM which also operates on the sub power. Alternatively, the microcomputer determines whether the clock IC has been reset by checking data held in the SRAM. The microcomputer determines failure of a water temperature sensor from a soak time calculated from time data from the clock IC and a detection value of the water temperature sensor on restarting of the engine. When the clock IC has been reset, the microcomputer prohibits this failure determination of the water temperature sensor.

23 Claims, 7 Drawing Sheets

ELECTRONIC CONTROL UNIT AND METHOD MEASURING AND USING ELECTRIC POWER-OFF PERIOD

CROSS REFERENCE TO RELATED APPLICATION

This application is based on and incorporates herein by reference Japanese Patent Applications No. 2000-195868 filed Jun. 29, 2000 and No. 2000-195872 filed Jun. 29, 2000.

BACKGROUND OF THE INVENTION

This invention relates to an electronic control unit and method, and particularly to a vehicle electronic control unit and method using a timing part such as a clock IC (integrated circuit) which measures time continuously irrespective of whether a microcomputer is operating or stopped.

Electronic control units (ECUs) for vehicles use a built-in clock IC as a timing part to measure elapsed time and use data from the clock IC to calculate time at which the ECU power supply has been turned off, i.e., an engine stoppage time (soak time), and store times at which failures of sensors and actuators have occurred and so on.

Failure determination of a temperature sensor for detecting the temperature of engine cooling water, for instance, is effected as follows. The engine cooling water temperature falls when a fixed time elapses after engine stoppage, and the clock IC measures the time elapsing while the engine is stopped. Then, failure of the water temperature sensor has is detected from how far the detected value (water temperature) from the sensor has fallen when a predetermined time elapses after the engine stoppage.

However, when the supply of power to the clock IC is interrupted and the clock IC is reset while the ECU power supply is turned off, a deviation arises in the time data of the clock IC. Then, for example when an engine stoppage time (soak time) is calculated from the time data of the clock IC, this time will be calculated erroneously. Thus, it becomes impossible to carry out sensor failure determination and the like correctly. That is, because it is not possible to confirm the validity of the time from the clock IC, the deviation arises in the time data causes problems in various parts of control carried out using such time data.

SUMMARY OF THE INVENTION

It is therefore a first object of the invention to provide an electronic control unit and method which can recognize correctly when an accidental resetting of a timing part has occurred.

It is a second object of the invention to provide an electronic control unit and method which can correctly carry out a determination of whether time data of a timing part is normal or abnormal.

According to the present invention, an electronic control unit has a timing part continuously supplied with an electric power to measure time and a control part operable to carry out a predetermined operation when the electric power is supplied. A first time measured by the timing part when the electric power to the control part is shut off is stored. A second time measured by the timing part when the electric power to the control part is re-started is read. The control part calculates a time period from the first time to the second time and use the time period in its predetermined operation. The control part checks operation of the timing part upon reading of the second time, and stops the predetermined operation when a check result indicates an abnormality of the timing part.

Preferably, the operation of the timing part is checked with respect to a resetting of the timing part after the electric power to the control part is shut off. Alternatively or in addition, the operation of the timing part is checked by comparing the second time with a prescribed time range that is set to differ from a reference time to which the timing part is reset upon an occurrence of abnormality of timing part.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
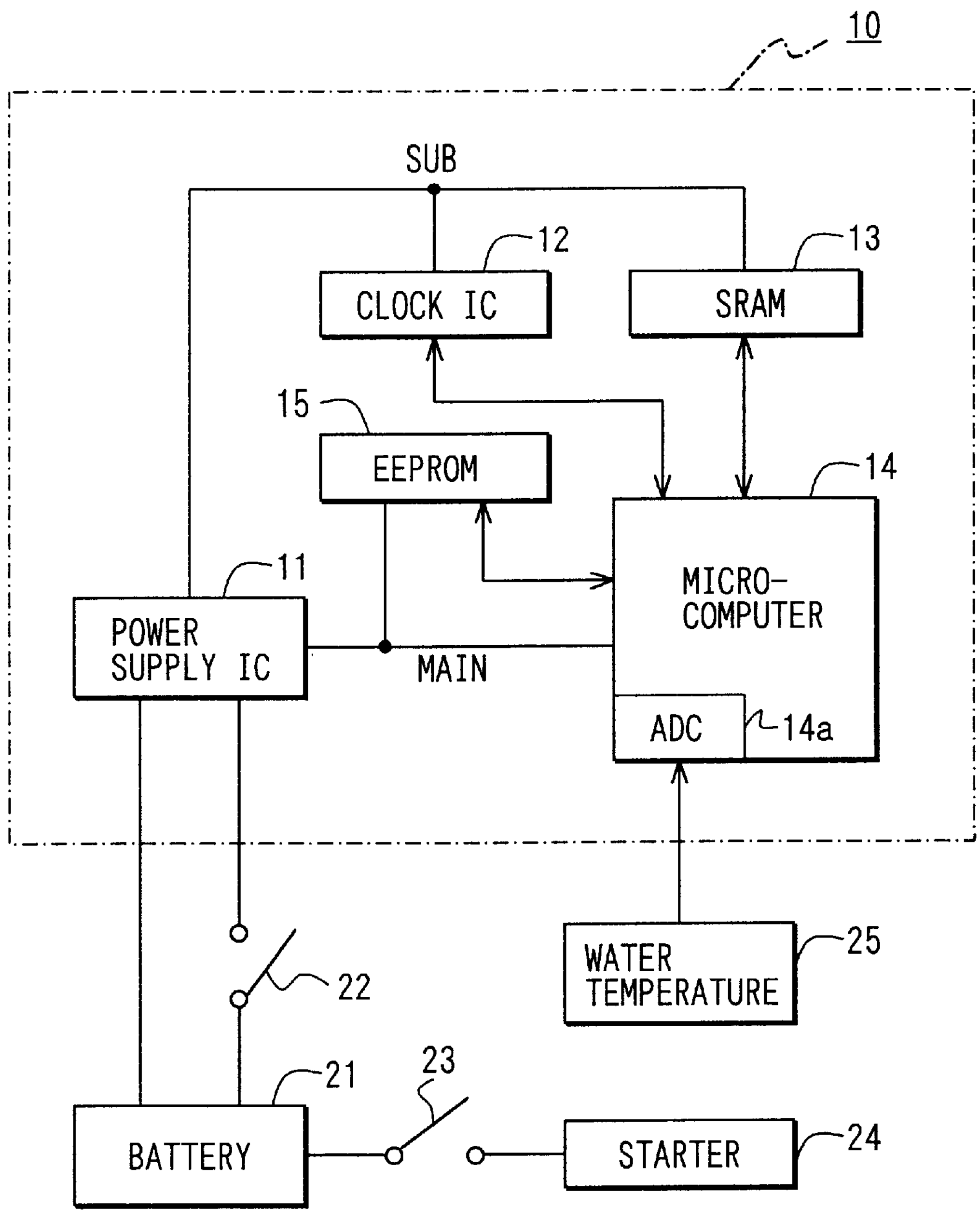
FIG. 1 is a block diagram showing a vehicle electronic control unit according to the invention.

Referring first to FIG. 1, an electronic control unit (ECU) 10 for a vehicle is connected to a battery 21 by two electrical power supply lines. A power supply IC 11 inside the ECU 10 is supplied with battery power in correspondence with ON/OFF of an ignition (IG) switch 22 by one of the supply lines and is also supplied with battery power at all times by the other supply line. A starter 24 is connected to the battery 21 by way of a starter switch 23.

The power supply IC 11 inside the ECU 10 generates and outputs a main power and a sub power (in this preferred embodiment, both 5V). The sub power is generated at all times irrespective of the ON/OFF state of the IG switch 22, while the main power is generated only when the IG switch 22 is ON. Of these, the sub power is supplied to a clock IC 12, which constitutes a timing part, and a standby RAM (SRAM) 13. As a result, the clock IC 12 can measure time continuously irrespective of ON/OFF of the IG switch 22. The SRAM 13 can hold stored content thereof even when the IG switch 22 is OFF.

The clock IC 12 divides a clock signal from a quartz crystal oscillator and counts ‘years, months, days, hours, minutes, seconds' with a built-in counter. Once a date and time are set, the clock IC 12 continues to operate as long as it continues to be supplied with electric power, so that accurate time data can be provided by a value inside the clock IC 12.

The main power is supplied to a microcomputer 14, constituting a control part, and an EEPROM 15. The microcomputer 14 comprises a known logical operation circuit made up of a CPU and memory and so on, and executes various data operations and control. Further, the microcomputer 14 periodically reads time data of the clock IC 12 and stores this time data in the SRAM 13 as necessary. The microcomputer 14 starts to operate as above when main power is supplied to it. That is, the microcomputer 14 operates when the IG switch 22 is turned on, and the microcomputer 14 stops operating when the IG switch 22 is turned off.

A water temperature sensor 25 detects the temperature THW of engine cooling water, and a detection value from the water temperature sensor 25 is read in to an A-D converter (ADC) 14*a* in the microcomputer 14. The microcomputer 14 determines the engine cooling water temperature THW periodically from the detection value of the water temperature sensor 25. The microcomputer 14 also carries out failure (abnormality) diagnosis of the water temperature sensor 25. When determining a failure of the water temperature sensor 25, the microcomputer 14 stores a failure code or the like indicating details of the failure in the EEPROM 15.

Figure 2:
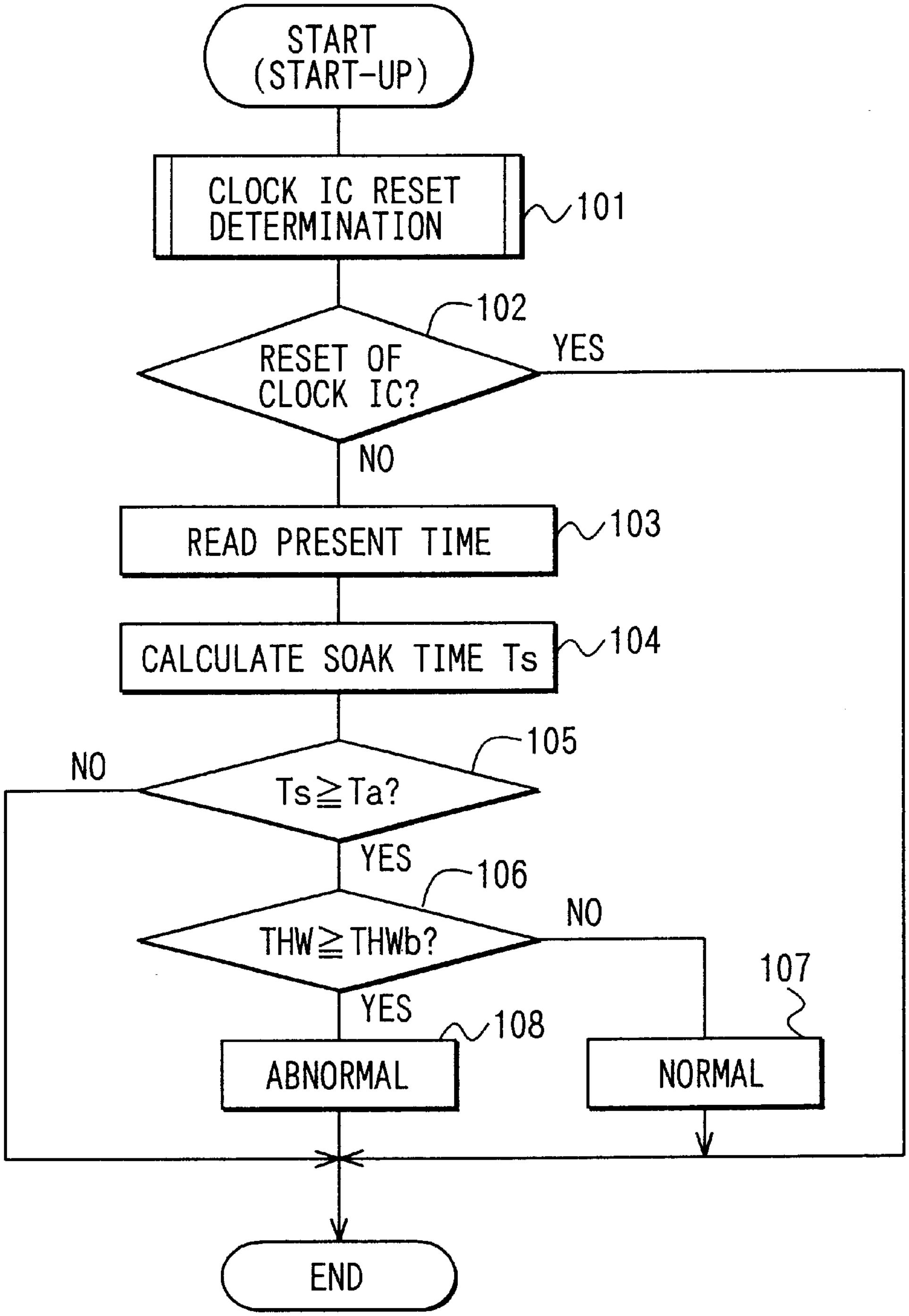
FIG. 2 is a flow chart showing a water temperature sensor failure determination routine executed in a first embodiment.

The microcomputer 14 is programmed to execute a routine for failure determination of the water temperature sensor 25 as shown in FIG. 2. The microcomputer 14 starts this routine when the microcomputer 14 starts up. The water temperature sensor 25 failure determination routine described here diagnoses failure of the water temperature sensor 25 from how far the water temperature detection value has fallen on starting of an engine (not shown) when the soak time (the time for which the vehicle has stood with the engine stopped) has exceeded a predetermined time.

Figure 5:
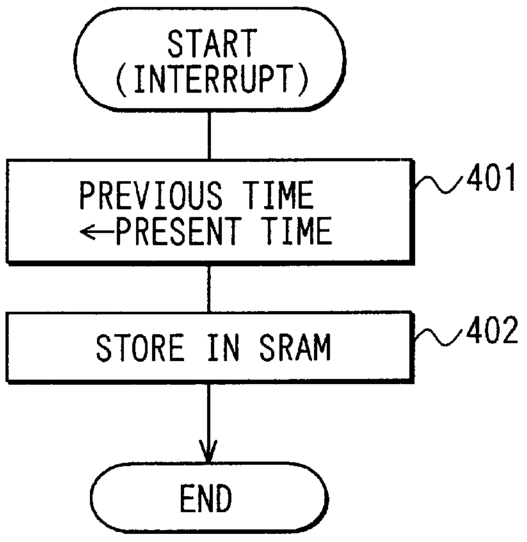
FIG. 5 is a flow chart showing an interrupt routine executed every second in the first embodiment.

Besides the routine of FIG. 2, the microcomputer 14 is programmed to execute a regular interrupt routine shown in FIG. 5 every second. In this routine, at step 401, the present time data of the clock IC 12 (the present time) is made to 'the previous time'. At the next step 402, this previous time is stored in the SRAM 13. Thus, when the engine is running normally, the time data of the clock IC 12 is stored as 'the previous time' in the SRAM 13 every second. Thus, the time data of the previous time in the SRAM 13 is updated. However, when the engine stops running (IG OFF), the time data of the previous time stored last remains in the SRAM 13, and this data is held even while the engine remains stopped.

When the microcomputer 14 starts to operate with the main power, the routine of FIG. 2 starts. In this routine, at step 101 a reset determination of the clock IC 12 is carried out. This reset determination is for determining whether there is evidence that the clock IC 12 was reset before the microcomputer started (while the engine was stopped). This determination processing is executed for example in accordance with the processing of FIG. 3 or FIG. 4.

At the next step 102, the result of step 101 is received and it is determined whether a resetting of the clock IC has been confirmed. When the clock IC 12 has been reset, the present processing ends without any subsequent failure determination processing being executed. When the clock IC 12 has not been reset, failure determination processing of step 103 onward is executed.

At step 103 the present time is read in from the clock IC 12, and at the following step 104 a soak time Ts is calculated using the elapsed time from the previous engine stoppage to the present time. That is, the soak time Ts is calculated from the difference between the present time read in at step 103 and the previous time from when the engine was stopped (the stored SRAM value of step 402, FIG. 5).

After that, at step 105, it is determined whether or not the soak time Ts thus calculated is longer than a predetermined time T<u>a</u> (for example 6 hours). When the determination is YES, at the following step 106 it is determined whether or not the cooling water temperature (sensor detection value) THW at that time is above a predetermined temperature THWb (for example 50° C.).

It can be inferred that the water temperature sensor 25 is normal, if the cooling water temperature (sensor detection value) THW has fallen sufficiently when the predetermined soak time Ts has elapsed. When the determination of step 106 is NO, it is determined at step 107 that the water temperature sensor 25 is normal. When the determination of step 106 is YES, it is determined at step 108 that the water temperature sensor 25 is abnormal (failure). At step 108, a diagnosis code or the like indicating that the water temperature sensor 25 has failed is stored in the EEPROM 15 and a warning light (MIL or the like) for warning that a failure has occurred is illuminated.

Next, the clock IC 12 reset determination processing (the sub-routine of step 101, FIG. 2) will be explained, using the flow charts of FIG. 3 and FIG. 4.

Figure 6:
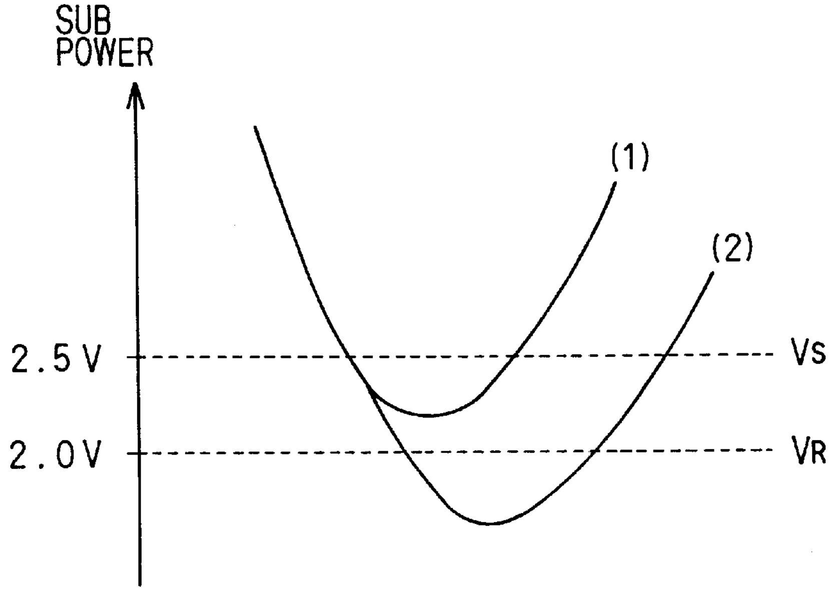
FIG. 6 is a time chart illustrating an operation of the first embodiment.

It is to be noted that the sub power is continuously supplied to the clock IC 12 and the SRAM 13. When this sub power drops to a low voltage region, the operation of the clock IC 12 is impeded and it becomes impossible for data to be stored properly in the SRAM 13. Specifically, as shown in FIG. 6, the reset voltage (the minimum operating voltage) $V_R$ of the clock IC 12 is about 2.0V. When the sub power supply voltage falls below the reset voltage the clock IC 12 is reset. The data holding voltage $V_S$ of the SRAM 13 is about 2.5V. When the voltage of the sub power supply falls below this data holding voltage, there is a possibility of the data in the SRAM 13 being destroyed.

In this case, although there is originally no function of monitoring resetting of the clock IC 12, the SRAM 13 has a power supply monitoring function. When the sub power supply voltage has fallen below the data holding voltage, it can leave a history of that. The reset voltage of the clock IC 12 and the data holding voltage of the SRAM 13 are relatively close, and the reset voltage is smaller than the data holding voltage. When using the power supply monitoring function of the SRAM 13, a history of the sub power supply voltage having fallen below the data holding voltage is confirmed. It can be inferred that there is a high probability of the clock IC 12 having been reset.

For example, in FIG. 6, when the sub power supply voltage falls as shown by (1) or (2) in the figure, a history of that drop in the sub power remains in the SRAM 13, because in both cases it falls below the data holding voltage (2.5V). Although the drop in the power supply voltage to the clock IC 12 is being determined indirectly by means of monitoring of the data holding voltage, resetting of the clock IC 12 can be detected without fail because of the size relationship between the different voltages.

Figure 3:
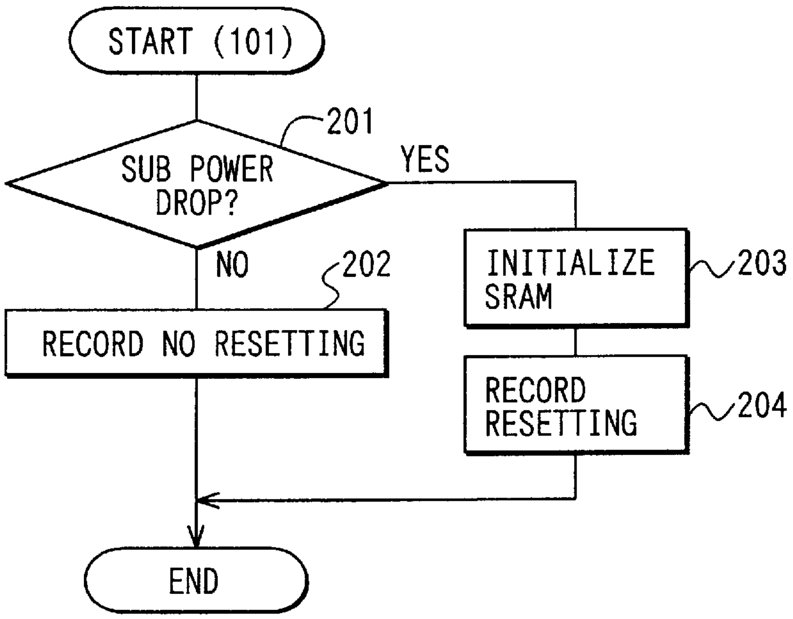
FIG. 3 is a flow chart showing clock IC reset determination processing in the routine shown in FIG. 2.

Referring now to FIG. 3, when the microcomputer 14 starts this resetting determination processing, at step 201 it is determined from the history left in the SRAM 13 whether or not there has been a drop in the sub power, while the microcomputer 14 stopped operation (while the engine was stopped). Then, if there has been no sub power drop, processing proceeds to step 202 and records that the clock IC 12 has not been reset and returns to the processing of FIG. 2. When there has been a sub power supply drop, at step 203 the SRAM 13 is initialized. At step 204, it is recorded that there has been a resetting of the clock IC 12 and then processing returns to FIG. 2.

Figure 4:
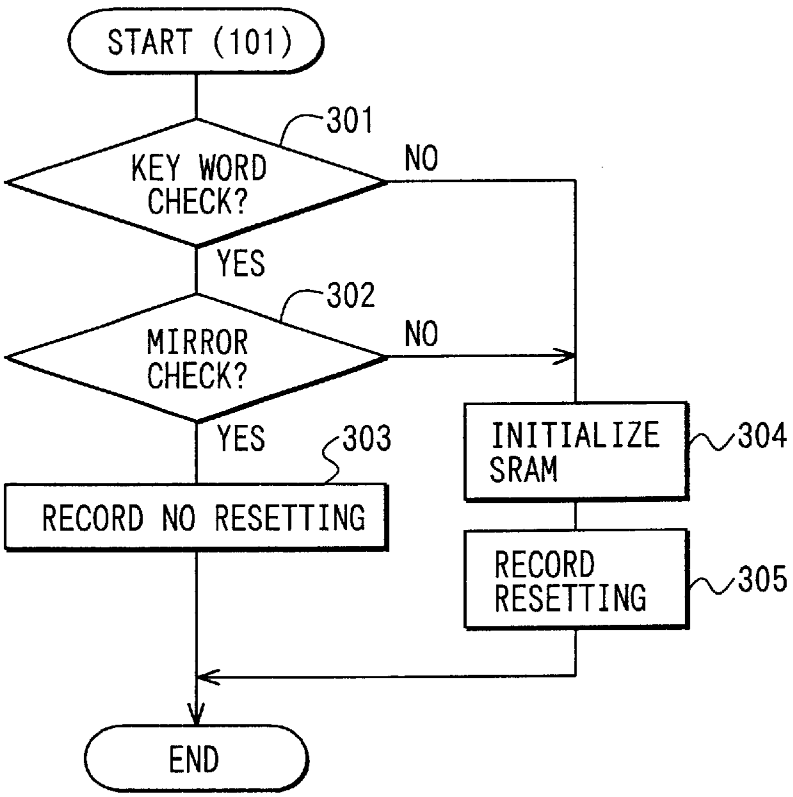
FIG. 4 is another flow chart showing clock IC reset determination processing in the routine shown in FIG. 2.

In the reset determination processing of FIG. 4 alternative to FIG. 3, resetting of the clock IC 12 is determined by checking the data stored in the SRAM 13 when the microcomputer 14 starts up. Specifically, a 'key word check' is carried out to check whether or not a predetermined key word stored in the SRAM 13 is correct, or a 'mirror check' is carried out to compare data stored in the SRAM 13 with a true value, or the like. In this case, if the check result is abnormal, it can be inferred that the probability of the clock IC 12 having been reset is also high because it can be presumed that data has been destroyed as a result of a drop in the sub power supply.

In practice, when the microcomputer 14 starts the routine of FIG. 4, at step 301 it carries out a key word check and at step 302 it carries out a mirror check. Then, if the results of steps 301 and 302 are both normal (YES), processing proceeds to step 303 and records that the clock IC has not been reset and then returns to the processing of FIG. 2. If the result of either of the steps 301 and 302 is abnormal (NO), at step 304 the SRAM 13 is initialized and at step 305 it is recorded that the clock IC has been reset. Then, the processing returns to FIG. 2.

Some of the advantages provided by the first embodiment described above are as follows.

It is determined whether or not the clock IC 12 has been reset when the microcomputer 14 starts up. Therefore, even if the clock IC 12 has been reset while the engine was stopped (while the microcomputer was stopped), this can be recognized immediately after start-up of the microcomputer.

Because the state of the power supply to the clock IC 12 is monitored indirectly from the history showing that the sub power supply voltage has fallen below the data holding voltage, it can be determined well whether or not there has been a resetting of the clock IC 12. In this case, the SRAM 13 itself or the microcomputer 14 has in advance a voltage monitoring function with the data holding voltage as a threshold voltage. By using this existing construction, it is possible to realize the existing unit without adding a new construction.

Because the state of the power supply to the clock IC 12 is monitored indirectly by checking the data held in the SRAM 13, it can be determined well whether or not there has been a resetting of the clock IC 12.

When it is determined that the clock IC 12 has been reset, failure determination of the water temperature sensor 25 is prohibited. Consequently there is no problem of failure determination results lacking validity due to erroneous time data from the clock IC 12 being used, and highly reliable sensor failure determination can be carried out.

The following variations of the first embodiment are also possible.

Clock IC reset determination may also be carried out for example at regular intervals during normal operation of the microcomputer (during normal running of the engine). In this case, it is possible to determine well whether or not the clock IC 12 has been reset not only while the microcomputer was stopped (while the engine was stopped) but also in other cases. As a result, it is possible to recognize accidental resetting of the clock IC 12 correctly.

Alternatively, the power supply voltage to the clock IC 12 (the sub power supply voltage) may be detected, and the resetting of clock IC 12 may be determined on the basis of results of detection of this power supply voltage. In this case it is possible to monitor the state of the power supply to the clock IC 12 directly and execute reset determination in correspondence with this. For example, a power supply voltage drop may be monitored for with the minimum operating voltage of the clock IC 12 or a voltage value somewhat higher than this as a threshold value.

Second Embodiment

The clock IC 12 normally is capable of indicating the date and time of about 100 years, but in a vehicle ECU the clock IC 12 is often used for the purpose of measuring a certain period of elapsed time. In this case the absolute time is not necessary. Further, because the clock IC 12 operates on a battery power (sub power), it is not used continuously for longer than the life of the battery.

Accordingly, in this second embodiment, for example, assuming that the battery life is a maximum of 20 years, the usage period of the clock IC is prescribed as the 20 years of 'year 20 month 01 day 01 hour 00 minute 00 second 00 to year 39 month 12 day 31 hour 23 minute 59 second 59'. Within this prescribed range the time is measured by the clock IC 12. The initial value to which the clock IC 12 is reset when there is a drop in the power supply voltage (the hard reset value) is generally 'year 00 month 01 day 01 hour 00 minute 00 second 00'. This prescribed range is set so as not to include the hard reset value of the clock IC 12. Also, when the clock IC 12 is initialized, the time data is initialized without fail to the starting time of the prescribed range, i.e., 'year 20 month 01 day 01 hour 00 minute 00 second 00'.

Figure 7:
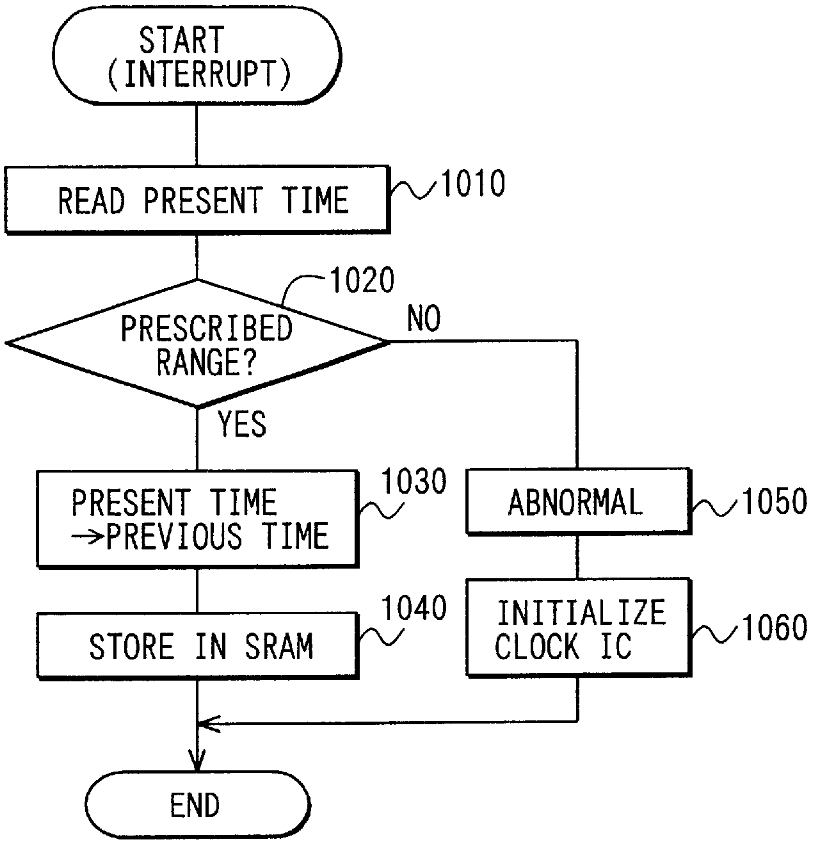
FIG. 7 is a flow chart showing an interrupt routine executed every second in a second embodiment of the invention.

Next, a processing procedure of the microcomputer 14 relating to abnormality determination of the clock IC 12 will be described. FIG. 7 is a flow chart showing periodic interrupt processing, and this processing is started by the microcomputer 14 every second.

First, at step 1010, the present time is read in from the clock IC 12, and then at step 1020 it is determined whether or not the present time is within the prescribed range. The prescribed range is, as described above, the 20 year period of 'year 20 month 01 day 01 hour 00 minute 00 second 00 to year 39 month 12 day 31 hour 23 minute 59 second 59'. For example when the clock IC 12 is reset due to a voltage drop of the battery power supply (sub power supply) or external noise or the like and its time data is consequently initialized to 'year 00 month 01 day 01 hour 00 minute 00 second 00', or when the clock IC 12 malfunctions and the stored time has deviated greatly, the present time will be outside the prescribed range (step 1020: NO).

When the determination of step 1020 is YES, it is inferred that the clock IC 12 is normal and processing proceeds to step 1030 and sets the present time as the 'previous time'. Then at the following step 1040, this previous time is stored in the SRAM 13.

Figure 8:
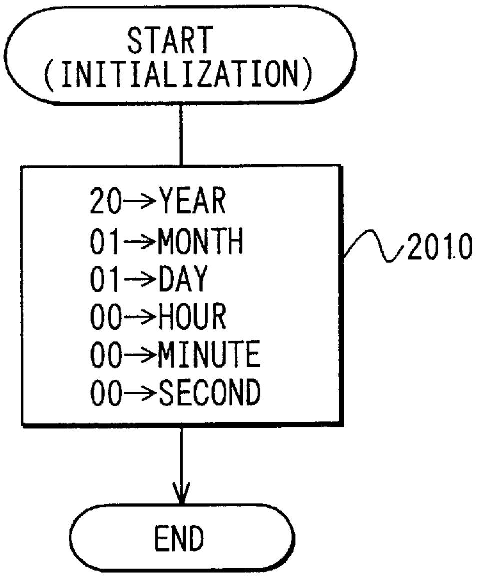
FIG. 8 is a flow chart showing an initialization routine executed in the second embodiment.

When the determination of step 1020 is NO, processing proceeds to step 1050 and determines that the clock IC 12 is abnormal or in failure. In this case, a history of this abnormality is stored in the EEPROM 15. At the following step 1060, the clock IC 12 is initialized. At this time, the microcomputer 14 jumps to the processing of FIG. 8 and at step 2010 sets the initial data of the year, month, day, hour, minute and second to 'year 20 month 01 day 01 hour 00 minute 00 second 00'.

Figure 9:
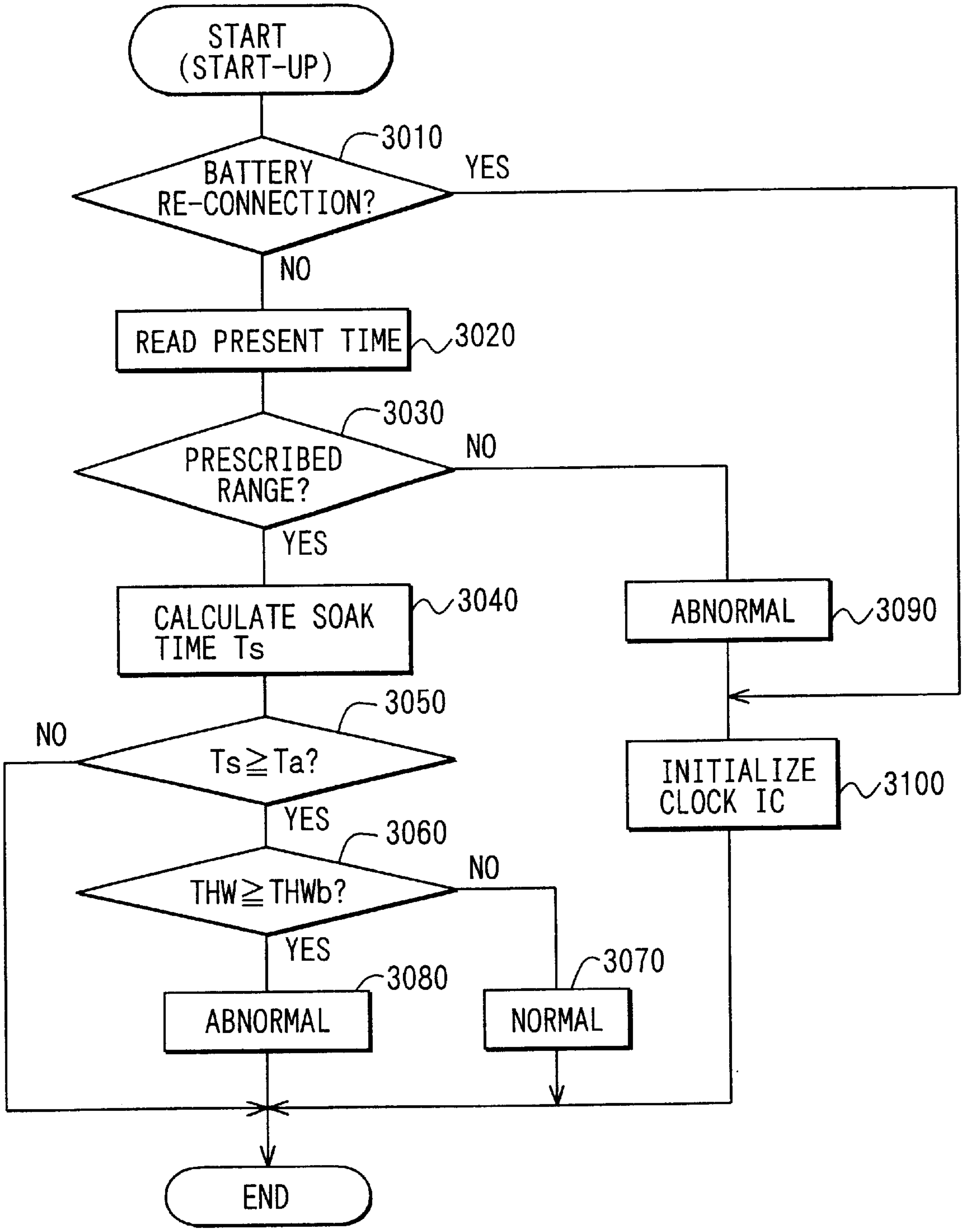
FIG. 9 is a flow chart showing a water temperature sensor failure determination routine executed in the second embodiment.

FIG. 9 is a flow chart showing a procedure for determining failure of the water temperature sensor 25. This processing is executed by the microcomputer 14, when it starts up. This water temperature sensor failure determination diagnoses failure of the water temperature sensor 25 from how far the water temperature detection value has fallen on starting of the engine, when the soak time Ts (the time for which the vehicle has stood with the engine stopped) has exceeded the predetermined time Ta. In this processing, clock IC abnormality determination is executed in the same way as in FIG. 7.

First, at step 3010, it is determined whether or not the battery 21 has been reconnected after a replacement or the like. This determination is executed for example with reference to the history held in the SRAM 13. In the case of a battery reconnection, processing proceeds immediately to step 3100 and initializes the clock IC 12 to the starting time of the prescribed range (processing of FIG. 8). In this case, water temperature sensor failure determination is not carried out.

When the determination of step 3010 is NO, processing proceeds to step 3020 and reads in the present time from the clock IC 12. Then at step 3030, it is determined whether or not the present time read in from the clock IC 12 is within the prescribed range.

When the result of step 3030 is YES, processing proceeds to step 3040 and calculates the soak time Ts from the time elapsed from when the engine was stopped to the present time. That is, the soak time is calculated from the difference between the present time read in at step 3020 and the previous time of when the engine was stopped (the SRAM value of step 1040 in FIG. 7).

After that, at step 3050, it is determined whether or not the soak time Ts thus calculated is greater than the predetermined time Ta (for example 6 hours). When the determination is YES, at the following step 3060 it is determined whether or not the cooling water temperature (sensor detection value) THW at that time is above the predetermined temperature THWb (for example 50° C.).

If the cooling water temperature (sensor detection value) has fallen sufficiently when the predetermined soak time has elapsed, it can be inferred that the water temperature sensor 25 is normal. When the determination of step 3060 is NO, it is determined that the water temperature sensor is normal at step 3070. When the determination of step 3060 is YES it is determined that the water temperature sensor 25 is abnormal at step 3080. At step 3080, a diagnosis code or the like expressing that the water temperature sensor 25 has failed is stored in the EEPROM 15 and a warning light (MIL or the like) for warning that a failure has occurred is illuminated.

When the result of step 3030 is NO, processing proceeds to step 3090 and determines that the clock IC 12 is abnormal. In this case, a history of that abnormality is stored in the EEPROM 15. At the following step 3100, the clock IC 12 is initialized to the starting time of the prescribed range (see the processing of FIG. 8). In this case, water temperature sensor 25 failure determination is not carried out.

The way the clock IC abnormality determination is carried out in the water temperature sensor failure determination described above will now be explained using the time chart of FIG. 10.

Figure 10:
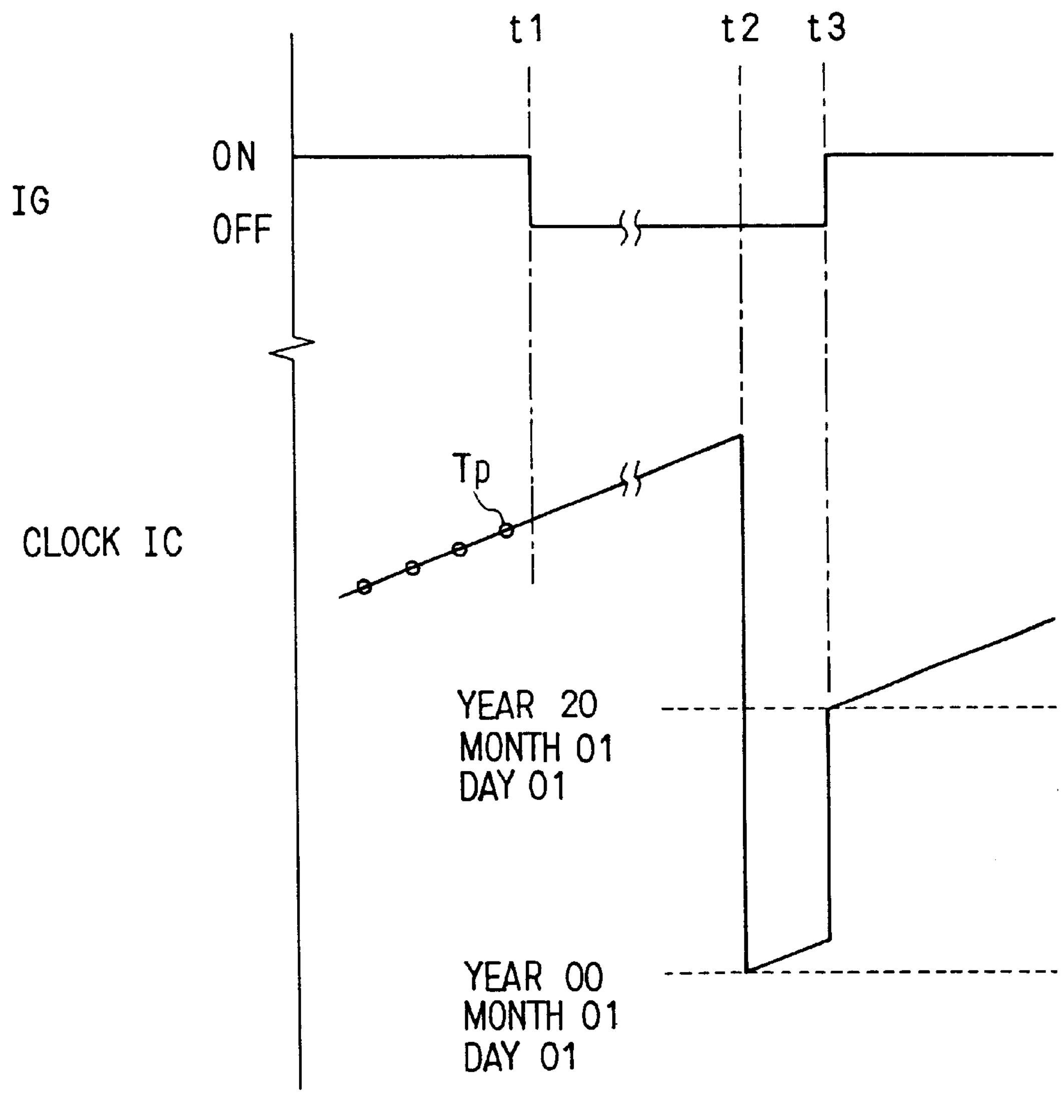
FIG. 10 is a time chart illustrating an operation of the second embodiment.

In FIG. 10, in the engine running period (period of normal operation of the microcomputer 14) before time t1, the time data of the clock IC 12 is read every 1 second and this time data is stored in the SRAM 13 as the previous time. When at the time t1 the IG switch 22 is turned off, thereafter the SRAM value ceases to be updated and the previous time 'Tp' from immediately before that is held in the SRAM 13 even after the IG switch 22 is turned off.

Even after the engine stops (and the microcomputer stops), the clock IC 12 using the sub power continues measuring time. If at time t2 the clock IC 12 is reset due to a drop in the power supply voltage or the like, its time data is initialized to 'year 00 month 01 day 01 hour 00 minute 00 second 00'.

After that, when at time t3 the IG switch 22 is turned on and the microcomputer 14 starts up, the failure determination processing of FIG. 9 is executed. In the case of FIG. 10, because the time data of the clock IC 12 is outside the prescribed range (year 20 month 01 day 01 hour 00 minute 00 second 00 to year 39 month 12 day 31 hour 23 minute 59 second 59), the microcomputer 14 determines that the clock IC 12 is abnormal and initializes the time data to 'year 20 month 01 day 01 hour 00 minute 00 second 00'. At this time, because the soak time (the elapsed time from the previous time Tp to when the microcomputer starts up) cannot be accurately measured, failure determination of the water temperature sensor 25 is prohibited.

Some of the advantages provided in this second embodiment are as follows.

A range for time measurement by the clock IC 12 is prescribed in advance so as not to include the predetermined value to which the clock IC 12 is normally reset (year 00 month 01 day 01 minute 00 second 00). For example, when the clock IC 12 is accidentally reset due to a voltage drop, external noise or the like and a deviation consequently arises in its time data. The time data of the clock IC 12 is outside the prescribed range and it can be determined that an abnormality has occurred. Therefore, a determination of whether the time data of the clock IC 12 is normal or abnormal can be carried out correctly.

When the time data of the clock IC 12 is outside the prescribed range, or when the battery 21 has been reconnected, the clock IC 12 is initialized to the starting time of the prescribed range even when an abnormality has occurred or the battery has been replaced. Thereafter the clock IC 12 can be made to operate normally.

Since failure determination of the water temperature sensor 25 is prohibited when abnormality of the clock IC 12 is determined, there is no problem of a failure determination result lacking validity due to erroneous time data from the clock IC 12 being used. Thus, highly reliable sensor failure determination can be carried out. Further, because a history thereof is stored in the EEPROM 15 when an abnormality of the clock IC 12 has occurred, failure diagnosis and analysis of the clock IC 12 is possible later.

In the above embodiment, the prescribed range which the clock IC 12 times can be changed freely. For example, if the average number of years for which the vehicle is used is shorter than the battery life, the prescribed range of the clock IC 12 may be set with the number of years for which the vehicle is likely to be used as a reference.

The present invention may be implemented in a manner that the first embodiment and the second embodiment are combined.

What is claimed is:

1. An electronic control unit comprising:

a control part which operates or stops in accordance with state of a first power voltage switched by a power supply switch; and a timing part which operates with a second power voltage different from the first power voltage of the control part and measures time continuously irrespective of whether the control part is operating or stopped, wherein the control part determines whether the timing part has been reset by monitoring supply of the second power voltage to the timing part, and wherein the control part calculates a time period of stoppage of supply of the first power voltage by the power supply switch, the calculated time period being used by the control part during an operation thereof with the supply of the first power voltage.

2. The electronic control unit according to claim 1, wherein:

the control part determines upon starting operation thereof whether the timing part has been reset while the control part stopped operation.

3. The electronic control unit according to claim 1, further comprising:

means for detecting the second power voltage of the timing part, wherein the control part determines whether the timing part has been reset on the basis of a result of detection of the second power voltage.

4. The electronic control unit according to claim 1, wherein the control part prohibits use of the calculated time period in the operation thereof upon determination that the timing part is reset during the time period of stoppage of supply of the first power voltage.

5. An electronic control unit comprising:

a control part which operates or stops in accordance with state of a first power voltage switched by a power supply switch;

a timing part which operates with a second power voltage different from the first power voltage of the control part and measures time continuously irrespective of whether the control part is operating or stopped, wherein the control part determines whether the timing part has been reset by monitoring supply of the second power voltage to the timing part; and a memory operable with the second power voltage to hold stored content and monitor whether the second power voltage is higher than a data holding voltage thereof that is higher than a threshold voltage required for the timing part to operate, wherein the control part determines whether the timing part has been reset on the basis of a history indicating that the second power voltage dropped below the data holding voltage.

6. An electronic control unit comprising:

a control part which operates or stops in accordance with state of a first power voltage switched by a power supply switch;

a timing part which operates with a second power voltage different from the first power voltage of the control part and measures time continuously irrespective of whether the control part is operating or stopped, wherein the control part determines whether the timing part has been reset by monitoring supply of the second power voltage to the timing part; and a memory operable with the second power to hold stored content, wherein the control part determines check data held in the memory and determines whether the timing part has been reset from a result of that check.

7. An electronic control unit comprising:

a control part which operates or stops in accordance with state of a first power voltage switched by a power supply switch;

a timing part which operates with a second power voltage different from the first power voltage of the control part and measures time continuously irrespective of whether the control part is operating or stopped, wherein the control part determines whether the timing part has been reset by monitoring supply of the second power voltage to the timing part; and a water temperature sensor for detecting the temperature of cooling water of a vehicle engine, wherein the control part determines failure of the temperature sensor from a time elapsed while the engine was stopped and a detection value of the water temperature sensor on restarting of the engine, and prohibits failure determination of the water temperature sensor when determining that the timing part has been reset.

8. An electronic control unit comprising:

a control part which operates or stops in accordance with state of a first power voltage switched by a power supply switch; and a timing part which measures time continuously with a second power voltage irrespective of whether the control part is operating or stopped and is initialized to a predetermined value when reset, wherein a range of time to be measured by the timing part which excludes the predetermined value is prescribed in advance, and wherein the control part determines that an abnormality has arisen in the timing part when the time of the timing part is outside the prescribed range, and wherein the control part calculates a time period of stoppage of supply of the first power voltage by the power supply switch, the calculated time period being used by the control part during an operation thereof with the supply of the first power voltage.

9. The electronic control unit according to claim 8, wherein:

the control part initializes the timing part to a starting time of the prescribed range when time data of the timing part is outside the prescribed range.

10. The electronic control unit according to claim 8, wherein:

the control part initializes the timing part to a starting time of the prescribed range when the second power voltage to the timing part has been temporarily cut off and then reconnected.

11. The electronic control unit according to claim 8, wherein:

the first power voltage and the second power voltage is supplied from a vehicle battery; and the prescribed range measured by the timing part is set with a potential lifetime of the battery as a reference.

12. The electronic control unit according to claim 8, wherein the control part prohibits use of the calculated time period in the operation thereof upon determination that the timing part is reset during the time period of stoppage of supply of the first power voltage.

13. An electronic control unit comprising:

a control part which operates or stops in accordance with state of a first power voltage switched by a power supply switch; and a timing part which measures time continuously with a second power voltage irrespective of whether the control part is operating or stopped and is initialized to a predetermined value when reset, wherein a range of time to be measured by the timing part which excludes the predetermined value is prescribed in advance, wherein the control part determines that an abnormality has arisen in the timing part when the time of the timing part is outside the prescribed range, and wherein the electronic control unit further comprises a nonvolatile memory operable to continuously hold stored content, and wherein the control part stores in the nonvolatile memory a history of occurrence of an abnormality in the timing part.

14. An electronic control unit comprising:

a control part which operates or stops in accordance with state of a first power voltage switched by a power supply switch; and a timing part which measures time continuously with a second power voltage irrespective of whether the control part is operating or stopped and is initialized to a predetermined value when reset, wherein a range of time to be measured by the timing part which excludes the predetermined value is prescribed in advance, wherein the control part determines that an abnormality has arisen in the timing part when the time of the timing part is outside the prescribed range, wherein the electronic control unit further comprises a water temperature sensor for detecting the temperature of cooling water of a vehicle engine, and wherein the control part determines failure of the temperature sensor from a time elapsed while the engine was stopped and a detection value of the water temperature sensor on restarting of the engine, and prohibits failure determination of the water temperature sensor when determining that the timing part has been reset.

15. An electronic control unit comprising:

a control part which operates or stops in accordance with state of a first power voltage switched by a power supply switch; and a timing part which operates with a second power voltage different from the first power voltage of the control part and measures time continuously irrespective of whether the control part is operating or stopped, wherein the control part determines whether the timing part has been reset by monitoring supply of the second power voltage to the timing part, wherein a range of time to be measured by the timing part which excludes the predetermined value is prescribed in advance, wherein the control part determines that an abnormality has arisen in the timing part when the time of the timing part is outside the prescribed range, and wherein the control part calculates a time period of stoppage of supply of the first power voltage by the power supply switch, the calculated time period being used by the control part during an operation thereof with the supply of the first power voltage.

16. The electronic control unit according to claim 15, wherein the control part prohibits use of the calculated time period in the operation thereof upon determination that the timing part is reset during the time period of stoppage of supply of the first power voltage.

17. An electronic control unit comprising:

a control part which operates or stops in accordance with state of a first power voltage switched by a power supply switch; and a timing part which operates with a second power voltage different from the first power voltage of the control part and measures time continuously irrespective of whether the control part is operating or stopped, wherein the control part determines whether the timing part has been reset by monitoring supply of the second power voltage to the timing part, wherein a range of time to be measured by the timing part which excludes the predetermined value is prescribed in advance, wherein the control part determines that an abnormality has arisen in the timing part when the time of the timing part is outside the prescribed range, and wherein the electronic control unit further comprises a water temperature sensor for detecting the temperature of cooling water of a vehicle engine, and wherein the control part determines failure of the temperature sensor from a time elapsed while the engine was stopped and a detection value of the water temperature sensor on restarting of the engine, and prohibits failure determination of the water temperature sensor when determining that the timing part has been reset or the abnormality has arisen in the timing part.

18. A method of operating an electronic control unit having a timing part continuously supplied with an electric power to measure time and a control part operable to carry out a predetermined operation when the electric power is supplied:

storing a first time measured by the timing part when the electric power to the control part is shut off;

reading a second time measured by the timing part when the electric power to the control part is re-started;

calculating a time period from the first time to the second time to use the time period in the predetermined operation by the control part, wherein the timing part is checked by the control part with respect to operation of the timing part upon reading of the second time, and wherein the predetermined operation of the control part is prohibited when a check result indicates an abnormality of the timing part.

19. A method of operating an electronic control unit having a timing part continuously supplied with an electric power to measure time and a control part operable to carry out a predetermined operation when the electric power is supplied, the method comprising:

storing a first time measured by the timing part when the electric power to the control part is shut off;

reading a second time measured by the timing part when the electric power to the control part is re-started;

calculating a time period from the first time to the second time to use the time period in the predetermined operation by the control part, wherein the timing part is checked by the control part with respect to operation of the timing part upon reading of the second time, wherein the predetermined operation of the control part is prohibited when a check result indicates an abnormality of the timing part, and wherein the operation of the timing part is checked with respect to a resetting of the timing part between the first time and the second time.

20. The method of operating an electronic control unit according to claim 19, wherein:

the resetting is detected when the electric power falls below a threshold voltage required for the timing part to measure time continuously.

21. A method of operating an electronic control unit having a timing part continuously supplied with an electric power to measure time and a control part operable to carry out a predetermined operation when the electric power is supplied, the method comprising:

storing a first time measured by the timing part when the electric power to the control part is shut off;

reading a second time measured by the timing part when the electric power to the control part is re-started;

calculating a time period from the first time to the second time to use the time period in the predetermined operation by the control part, wherein the timing part is checked by the control part with respect to operation of the timing part upon reading of the second time, and wherein the predetermined operation of the control part is prohibited when a check result indicates an abnormality of the timing part, and wherein the operation of the timing part is checked by comparing the second time with a prescribed time range that is set to differ from a reference time to which the timing part is reset upon an occurrence of abnormality of timing part.

22. The method of operating an electronic control unit according to claim 21, wherein:

the prescribed time range is different from the reference time more than a predetermined time period.

23. The method of operating an electronic control unit according to claim 22, wherein:

the timing part is set to one of fixed times which define the prescribed time range when the second time is outside the prescribed time range.

* * * * *